3,299,649
SEPARATION SYSTEMS
William L. McGrath and Stanley J. Rachfal, Syracuse, N.Y., assignors to Carrier Corporation, Syracuse, N.Y., a corporation of Delaware
Filed Feb. 1, 1966, Ser. No. 524,335
10 Claims. (Cl. 62—79)

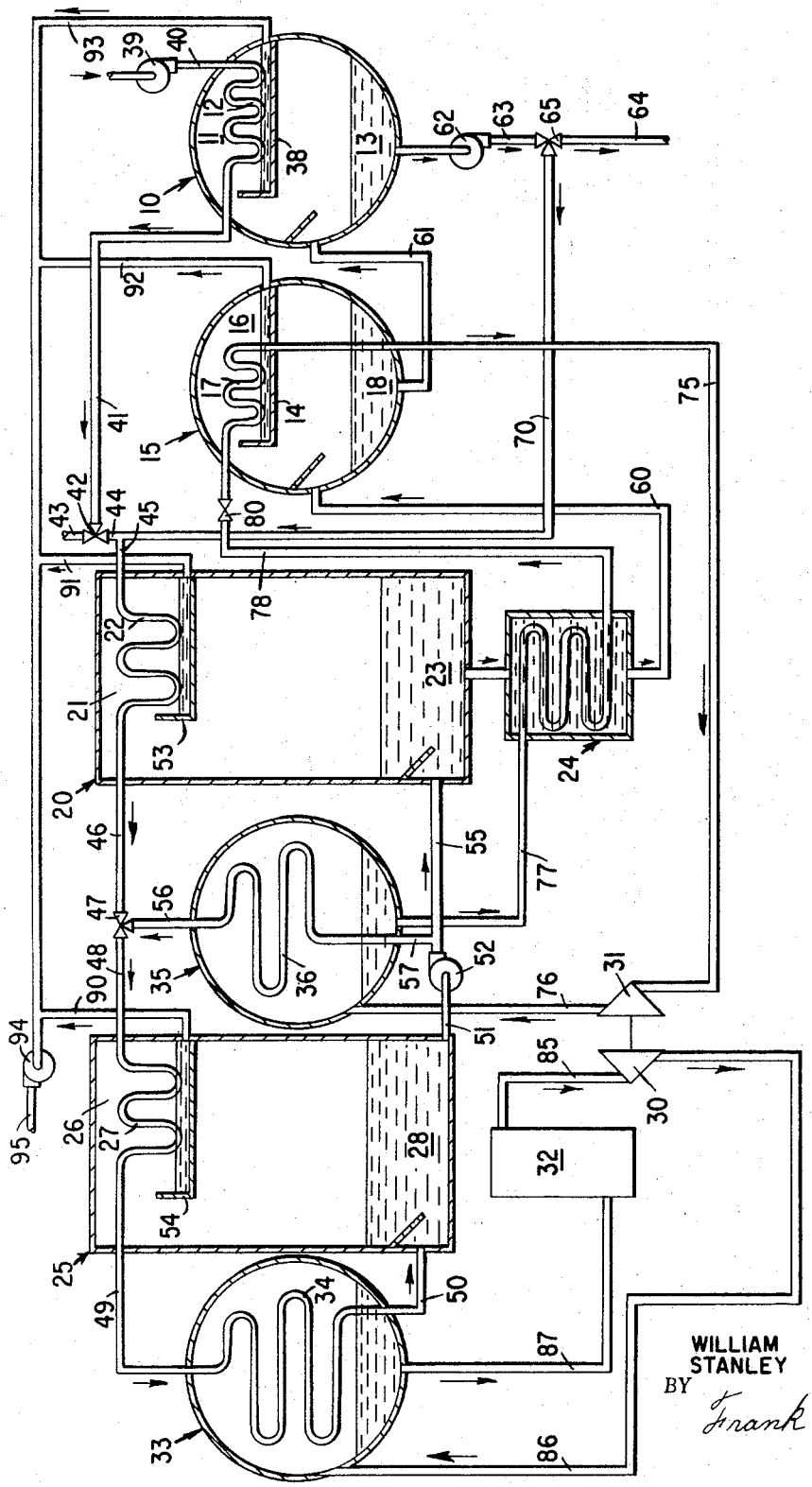

This invention relates to the separation of a solvent from a solution, and more particularly, to arrangements of the type described which employ a refrigeration system as a heat pump in conjunction with a solution evaporator.

Because of the ever increasing need for fresh water for human consumption in many regions of the world, much attention has been turned to various systems for converting sea water or other brackish water into potable water. One of the systems which appears to be economically promising is the multiple stage distillation evaporator. This apparatus comprises a large number of stages, each having a condensing section with a heat exchanger therein, and an evaporating section. Relatively cool sea water is successively passed through the heat exchangers in each of the condensing sections wherein fresh water is produced by condensation of water vapor. As the sea water passes from stage to stage, it becomes successively warmer in each stage and after leaving the final stage of the process, additional heat is supplied to the sea water. The hot sea water is then passed in the opposite direction back through the successive evaporating sections of each stage where water vapor is evaporated from the sea water due to heat exchange with the relatively cool sea water passing through the condensing sections.

The system described is moderately efficient, but it is desirable to improve the efficiency of the process in order to bring the cost of the fresh water down to a more satisfactory and commercially practicable level. Two approaches have been taken to improving the efficiency of the system. First, it is known that the addition of a refrigeration system operating to pump heat between the inlet of the first evaporator stage and the outlet of the last evaporator stage can result in a material improvement in the efficiency of the cycle and a significant decrease in the operating costs of the plant. Second, it is also known that with a conventional still, increasing the maximum temperature of the sea water at the high temperature end of the flash evaporator will cause a substantial increase in thermodynamic efficiency, limited only by the maximum temperature which can be tolerated due to scale formation in the evaporator. It would seem, therefore, that by combining a high temperature evaporator with a heat pump, a highly efficient and economically attractive system would result.

Unfortunately, however, the refrigerant compressor required for the heat pump in a large system utilizing a high sea water temperature is complex and expensive, generally requiring a complicated multistage compressor suitable for high temperature operation because of the high compressor lift requirements. Furthermore, the economic attractiveness of the system is still much lower than that which would be expected because there is a significant thermodynamic deterioration of the efficiency of the heat pump cycle as the condensing temperature is increased toward the critical temperature of the refrigerant. These considerations outweigh the opponent theoretical thermodynamic advantages which can be achieved by a high temperature evaporator in combination with a heat pump.

Accordingly, it is an object of this invention to provide a separation system having high thermodynamic efficiency and which overcomes some of the disadvantages and limitations inherent in prior systems.

It is a further object of this invention to provide a separation system and method of operation thereof which effectively combines the advantages of a high efficiency refrigeration system with a high temperature distillation system.

The features of this invention are achieved in the illustrated embodiment thereof by providing a separation system having a refrigerated flash evaporator, a low temperature flash evaporator, and a high temperature flash evaporator, each having a condensing section with a heat exchanger therein and an evaporating section. In addition, a turbine driven refrigerant compressor is provided in the system together with a turbine condenser and a refrigerant condenser.

Sea water is passed through the heat exchanger in the condensing section of the low temperature flash evaporator to condense water vapor to form fresh water therein. One portion of the sea water is then passed through the heat exchanger in the condensing section of the high temperature evaporator where additional fresh water is condensed. This portion of the sea water is then additionally heated by passing it through the turbine condenser where power fluid is simultaneously condensed. The heated sea water is returned through the evaporating section of the high temperature flash evaporator where water vapor is flashed from the solution to provide vapor for condensation in the condensing section thereof. The other portion of the sea water leaving the condensing section of the low temperature flash evaporator is heated by passing it directly through the refrigerant condenser wherein the refrigerant vapor is condensed. This other portion of sea water is heated in the refrigerant condenser to substantially the same temperature as that of the sea water leaving the evaporating section of the high temperature flash evaporator. The two portions of sea water from the high temperature flash evaporator and the refrigerant condenser are mixed and passed through the evaporating section of the low temperature flash evaporator in order to flash additional water vapor therefrom to provide water vapor for condensation in the condensing section thereof. The sea water passes from the evaporating section of the low temperature flash evaporator into the evaporating section of the refrigerated flash evaporator where still further water vapor is flashed therefrom.

Liquid refrigerant is passed into the heat exchanger in the condensing section of the refrigerated flash evaporator and evaporated therein to condense more water vapor to form additional fresh water. The vaporized refrigerated is then withdrawn from the refrigerated flash evaporator, compressed by the compressor, condensed in the condenser and returned to the refrigerated flash evaporator. Additional cycle efficiency is achieved by passing the refrigerant from the refrigerant condenser through the evaporating section of the low temperature flash evaporator in heat exchange relation with sea water therein in order to add heat to assist in flashing sea water, and at the same time, cool the refrigerant to increase the cooling capacity of the refrigerated flash evaporator.

The arrangement described enables the refrigeration system to operate at high efficiency because it has a temperature lift lower than the total lift between the turbine condenser and the refrigerant evaporator. Consequently, common refrigerants may be employed having good thermodynamic characteristics and without the necessity of a critical temperature which is unusually high. This also results in a great simplification in the compressor design, reducing the initial cost of the system, while at the same time providing substantially higher thermodynamic efficiency for the entire separation system cycle than that which is obtainable in previous systems. At the same time, the advantages of a high temperature flash distillation system may be achieved since the turbine condenser may operate at a substantially higher temperature than the refrigerant condenser and thus the high efficiency, which is characteristic of a high temperature flash evaporator, is realized.

In a system in accordance with this invention, the maximum sea water temperature can be determined independently of optimum refrigerant heat pump lift requirements, and at the same time, the refrigerant heat pump system can be designed independently of the optimum high temperature evaporator design.

This invention will be more fully understood by reference to the description and attached drawing, wherein the drawing is a schematic flow diagram of a saline water conversion system embodying this invention.

This invention will be described with reference to a saline water conversion plant for providing fresh or potable water from sea water. It will be appreciated, however, that the system to be described has general application for separating a solvent from a solution.

The system shown in the drawing includes a flash cooler 10 having a condensing section 11 with heat exchanger 12 therein and an evaporating section 13. A refrigerated flash evaporator 15 is provided having a condensing section 16 with a heat exchanger 17 therein and an evaporating section 18. A low temperature flash evaporator 20 is provided with a condensing section 21 having a heat exchanger 22 therein and an evaporating section 23. A high temperature flash evaporator 25 is provided with a condensing section 26 having a heat exchanger 27 therein and an evaporating section 28. Each of the flash evaporators described are provided with a suitable collecting pan in the condensing section thereof and a discharge line for discharging collected fresh water condensed therein. Further, each of the flash evaporators may comprise single stage evaporators as shown, or may be divided into a plurality of stages or compartments each of which is similar to the single stage evaporators shown for simplicity in the drawing. The design of a multistage flash evaporator or cooler is well known and need not be more fully described herein. While flash evaporators are employed in the illustrated embodiment of this invention, submerged tube evaporators or stills of well known design may be employed instead, for one or more of the flash evaporators or stages thereof.

A turbine 30 is connected to drive a centrifugal compressor 31. Turbine 30 may be directly connected to the compressor as for example, by a mechanical shaft connection, or the compressor may be driven indirectly by the turbine, as for example, where the turbine drives an electrical power generator which supplies power for an electric motor driven compressor. Any heat operated prime mover, such as a gas turbine, may be employed to drive compressor 31, either directly or indirectly as explained above, by supplying suitable heat energy to operate the prime mover.

A boiler 32 is provided for supplying vaporized power fluid to drive turbine 30. A power cycle heat exchanger comprising turbine condenser 33 having a heat exchanger 34 therein is connected to recover the heat from the gaseous exhaust of the turbine or other prime mover. A refrigerant condenser 35 having heat exchanger 36 therein is also provided.

Sea water is passed by pump 39 and sea water line 40 through heat exchanger 12 in the condensing section of flash cooler 10. The relatively cool sea water, which may have a temperature of about 70° F., is in heat exchange relation with warmer water vapor in condensing section 11 thereby heating the sea water to about 80° F. and condensing water vapor in condensing pan 38. The heated sea water passes through line 41 to a diverting valve 42. Some of the sea water is discharged to the sea through discharge line 43 and the remainder is passed by lines 44 and 45 through heat exchanger 22 in the condensing section of low temperature flash evaporator 20. The sea water is relatively cool with respect to the water vapor in the condensing section and passes through condensing section 21 in heat exchange relation with the water vapor, thereby heating the sea water to about 110 to 170° F. and condensing additional water vapor in condensing pan 53. The sea water emerges from heat exchanger 22 through line 46 and is split into two portions by diverting valve 47. The first portion of the sea water is passed by line 48 through heat exchanger 27 in the condensing section of high temperature flash evaporator 25. The sea water, which is still relatively cool with respect to the water vapor in condensing section 26, is further heated to a temperature of about 240° F. while passing in heat exchange relation with the water vapor and condenses additional water vapor in condensing pan 54.

The sea water is passed from heat exchanger 27 through line 49 into heat exchanger 34 in turbine condenser 33. The sea water is relatively cool with respect to the power fluid vapor in the turbine condenser and condenses power fluid therein while the sea water is further heated to a temperature of about 250° F.

The sea water leaves heat exchanger 34 and is passed through sea water line 50 into evaporating section 28 of high temperature flash evaporator 25. The sea water, which is relatively warm with respect to the cool solution in heat exchanger 27, flashes or boils causing water vapor to pass from evaporating section 28 into condensing section 26. The cooled sea water passes from evaporating section 28 through line 51, pump 52 and line 55 into evaporating section 23 of low temperature flash evaporator 20.

The other porton of the sea water split by diverting valve 47 passes through line 56 and heat exchanger 36 in refrigerant condenser 35. This other portion of sea water is in heat exchange relation with refrigerant vapor in the refrigerant condenser causing the refrigerant vapor to condense while heating the sea water. This other portion of the sea water is passed from heat exchanger 36 through line 57 where it mixes in line 55 with the first portion of sea water leaving evaporating section 28 of high temperature flash evaporator 25. Diverting valve 47 is adjusted with respect to the temperatures and heat exchange surface in high temperature flash evaporator 25 and condensers 33 and 35 so that the temperature of the sea water leaving refrigerant condenser 35 is substantially the same as the temperature of the sea water leaving evaporating section 28. Assuming a maximum sea water temperature entering evaporating section 28 of about 250° F., the sea water temperature passing through line 55 may be on the order of about 120° F. to 180° F.

The recombined portions of the sea water are mixed and passed through line 55 into evaporator section 23 of low temperature flash evaporator 20. This sea water is relatively warm with respect to that passing through heat exchanger 22 so that additional water vapor is flashed from the sea water in evaporating section 23 and the vapor passes into condensing section 21.

The sea water then passes from evaporating section 23 through heat exchanger 24 and line 60 into solution evaporating section 18 of refrigerated flash evaporator 15. This sea water may be at a temperature of about 100° F. and is relatively warm with respect to the temperature of the refrigerant evaporting in refrigerant evaporator 17 so that additional water vapor is flashed from the sea water in solution evaporating section 18 and passes into condensing section 16.

The sea water then passes from refrigerated flash evaporator 15 through line 61 into the evaporating section 13 of flash cooler 10. Again, the sea water in evaporating section 13 is relatively warm with respect to the sea water passing through the heat exchanger 12 and still more water vapor is evaporated from the sea water and passes into condensing section 11.

The sea water having a substantially increased salt concentration by successive flashing of water vapor in the various stages of the various evaporating sections through which it is passed, is discharged by pump 62 through brine line 63. A portion of the brine is split off by diverting valve 65 and is passed through brine line 70 into sea water line 45 for recirculation through the system. The remaining brine is discharged from the system through brine line 64.

Refrigerant is vaporized and withdrawn from heat exchanger 17 in refrigerant flash evaporator 15 by compressor 31. The vaporized refrigerant passes through line 75 into compressor 31 where it is compressed and the compressed refrigerant is discharged through line 76 into refrigerant condenser 35. The refrigerant is cooled by heat exchange with sea water passing through heat exchanger 36 and is thereby condensed in the condenser.

The condensed refrigerant passes through line 77 into refrigerant heat exchanger 24 preferably disposed below the evaporating section of low temperature evaporator flash 20. The refrigerant in refrigerant heat exchanger 24 is placed in heat exchange relation with sea water in evaporator section 23, thereby additionally cooling the liquid refrigerant and imparting additional heat to the sea water. The heated sea water is then flashed in refrigerated flash evaporator 18 (as shown) or in a subsequent stage of the low temperature flash evaporator. Where the low temperature flash evaporator has more than two stages, the refrigerant heat exchanger may comprise a plurality of heat exchangers for separately heating the sea water discharged from each stage prior to introduction into the succeeding stage. The result of this heat exchange is twofold: First, the additional heat imparted to the sea water assists in flashing more water vapor from the sea water in the following flash evaporator stage; and second, the additional cooling of the liquid refrigerant causes a substantial increase in the refrigeration capacity and heat transfer in refrigerant evaporator 17.

The cooled liquid refrigerant passes from refrigerant heat exchanger 24 through line 78 to expansion valve 80 into the refrigerant evaporator 17 in the refrigerated flash evaporator 15. The refrigerant absorbs heat from the water vapor present in the refrigerant flash evaporator thereby condensing additional fresh water in evaporator pan 14. The refrigerant employed may be trichloromonofluoroethane and the refrigerant evaporator and condenser temperatures may be about 70° F. and 180° F. respectively.

A suitable power fluid, such as water, is vaporized by being heated in boiler 32 and the vaporized power fluid is passed through line 85 to turbine 30 to supply power for operation thereof. The power fluid discharged from turbine 30 passes through line 86 into turbine condenser 33. The power fluid is in heat exchanger 34 causing the power fluid to condense. The condensed power fluid passes through condensate line 87 back to boiler 82 for revaporization. The fresh water condensed in the condensing sections of the flash evaporator is passed from the respective condensing pans through lines 90, 91, 92, and 93 by pump 94 into fresh water line 95 for storage and distribution to a desired location.

In the case of the saline water conversion apparatus described, the water passing through line 95 is highly pure and free from salts because the salts do not evaporate with the water vapor flashed in the flash evaporators. However, in some instances, such as fruit juice concentration, the effluent liquid of the system discharged through line 64 may be the product and in other instances may constitute a valuable by-product of the separation system.

By the practice of the invention a number of the limitations effecting the efficiency of prior saline water conversion systems are overcome. While it would be expected that the optimum cycle efficiency would result from combining a high efficiency heat pump with a high temperature flash evaporator spanning the same temperature difference, it has been discovered that this is not true. In particular, it has been discovered that optimum cycle efficiency and minimum initial system cost results from operating the refrigerant condenser at a lower temperature than the turbine condenser. By doing this, the efficiency advantages of a high maximum brine temperature are achieved without imposing the limitations on the heat pump cycle which would otherwise be present. At the same time, the refrigerant and refrigeration compressors can be chosen without regard to the maximum brine temperature so that an optimum efficiency refrigerant cycle can be provided. Since the refrigerant condenser operates at a lower temperature than the turbine condenser, the refrigeration cycle may operate substantially below the critical temperature of the refrigerant so that the efficiency of the cycle is greatly improved. Furthermore, since the temperature lift across the compressor may be selected without regard to the turbine condenser temperature, a relatively inexpensive, standard refrigerant compressor may be employed or the compressor can be designed without limitations being imposed on it by the high pressures associated with the temperature at which the turbine condenser operates.

Various modifications of the present invention may be made without departing from the scope thereof. In particular, the position of the flash cooler and the refrigerant flash evaporator may be reversed, if desired, and the temperatures employed at various points in the system may be changed to correspond with the requirements and desired operating conditions of a particular system. Also, the refrigerant evaporator could be located to remove heat from any convenient source such as directly from sea water. Other types of evaporators and heat exchangers may be employed by making suitable modifications in the design of the systems to accommodate them. The solution flow may be changed to achieve maximum efficiency in a multistage evaporator. Likewise, while the flash evaporators and condensers have been shown as separate components, it is possible to combine a number or all of them or various stages of them into a unitary physical structure for simplicity of construction.

Other modifications and embodiments of this invention are possible within the scope of the following claims.

We claim:
1. An apparatus for separating a solvent from a solution comprising:
   (a) a low temperature evaporator having a condensing section and an evaporating section;
   (b) a high temperature evaporator having a condensing section and an evaporating section;
   (c) a refrigerant evaporator comprising a heat exchanger for evaporating refrigerant;
   (d) a refrigerant condenser comprising a heat exchanger for condensing refrigerant;
   (e) a prime mover and means to supply heat energy to drive said prime mover;
   (f) a power cycle heat exchanger for rejecting heat from said prime mover;
   (g) means to pass said solution through the condensing section of said low temperature evaporator to condense solvent vapor therein;
   (h) means to pass one portion of the solution from said low temperature section of said evaporator through the condensing section of said high temperature evaporator to condense solvent vapor therein;
   (i) means to pass said one portion of solution from the condensing section of said high temperature evaporator through said power cycle heat exchanger to the evaporating section of said high temperature evaporator to heat said solution to a temperature sufficient to cause evaporation of solvent vapor therefrom;
   (j) means to pass another portion of the solution from the condensing section of said low temperature evaporator through said refrigerant condenser to con- dense refrigerant vapor and to heat said other portion of solution to a temperature lower than the temperature of the solution leaving said power cycle heat exchanger;

(k) means to pass both portions of solution through the evaporating section of said low temperature evaporator to evaporate additional solvent vapor therefrom;

(l) a compressor driven by said prime mover connected to evaporate and withdraw refrigerant from said refrigerant evaporator, and to pass said refrigerant vapor to said refrigerant condenser;

(m) means to pass condensed refrigerant from said refrigerant condenser to said refrigerant evaporator for evaporation therein; and (n) means to collect solvent condensed in the condensing sections of said evaporators, and means to withdraw and discharge solution from said system.

2. An apparatus for separating a solvent from a solution as defined in claim 1 wherein said high temperature evaporator and said low temperature evaporators each comprise multistage flash evaporators.

3. An apparatus for separating a solvent from a solution as defined in claim 1 wherein said prime mover comprises a turbine, and said power cycle heat exchanger comprises a turbine condenser for simultaneously heating solution and condensing a power fluid exhausted from said turbine by passing said solution and said power fluid in heat exchange relation with each other.

4. An apparatus for separating a solvent from a solution as defined in claim 1 wherein said means for passing refrigerant from said refrigerant condenser to said refrigerant evaporator includes a refrigerant heat exchanger for passing refrigerant from said condenser in heat exchange relation with solution from said low temperature evaporator to add heat to said solution to assist in vaporizing solvent therefrom and to increase the cooling capacity of said refrigerant evaporator.

5. An apparatus for separating a solvent from a solution comprising:

(a) a low temperature evaporator having a condensing section and an evaporating section;

(b) a high temperature evaporator having a condensing section and an evaporating section;

(c) a refrigerated evaporator having a condensing section with a refrigerant evaporator therein, and a solution evaporating section;

(d) a refrigerant condenser comprising a heat exchanger for condensing refrigerant;

(e) a prime mover and means to supply heat energy to drive said prime mover;

(f) a power cycle heat exchanger for recovering heat discharged from said prime mover;

(g) means to pass said solution through the condensing section of said low temperature evaporator to condense solvent vapor therein;

(h) means to pass one portion of the solution from said low temperature section of said evaporator through the condensing section of said high temperature evaporator to condense solvent vapor therein;

(i) means to pass said one portion of solution from the condensing section of said high temperature evaporator through said power cycle heat exchanger to the evaporating section of said high temperature evaporator to condense refrigerant vapor in said condenser and to heat said solution to a temperature sufficient to cause evaporation of solvent therefrom;

(j) means to pass another portion of solution from the condensing section of said low temperature evaporator through said refrigerant condenser to condense refrigerant vapor and to heat said other portion to substantially the same temperature as said one portion of solution leaving said high temperature evaporator;

(k) means to mix said one portion of solution from the evaporating section of said high temperature evaporator with said other portion of solution from said refrigerant condenser and to pass both portions of solution through the evaporating section of said low temperature evaporator to evaporate additional solvent vapor therefrom;

(l) means to pass solution from the evaporating section of said low temperature evaporator to the solution evaporating section of said refrigerated evaporator for evaporation of additional solvent vapor therefrom;

(m) a compressor driven by said prime mover connected to evaporate and withdraw refrigerant from said refrigerant evaporator, to condense additional solvent vapor in the condensing section of said refrigerated evaporator, and to pass said refrigerant vapor to said refrigerant condenser;

(n) means to pass condensed refrigerant from said refrigerant condenser to said refrigerant evaporator for evaporation therein; and (o) means to collect solvent condensed in the condensing sections of said evaporators, and means to withdraw solution from said refrigerated evaporator and to discharge the solution from the system.

6. An apparatus for separating a solvent from a solution as defined in claim 5 wherein said apparatus further includes a cooler having a condensing section; and an evaporating section; said solution being supplied to the condensing section of said low temperature evaporator from the condensing section of said cooler to condense additinal solvent vapor in said cooler; means for passing solution from the solution evaporating section of said refrigerated evaporator and passing it through the evaporating section of said cooler to vaporize solvent therefrom, and means to collect and distribute the additional fresh water condensed in the condensing section of said cooler.

7. An apparatus for separating a solvent from a solution as defined in claim 5 including means to pass a portion of the solution withdrawn from the solution evaporating section of said refrigerated evaporator through the condensing section of said low temperature evaporator, to recirculate solution in said apparatus.

8. A method of separating a solvent from a solution in an apparatus including a refrigerant evaporator, a high temperature evaporator having a condensing section and an evaporating section, a low temperature evaporator having a condensing section and an evaporating section, a refrigerant compressor driven by a prime mover, a power cycle heat exchanger, and a refrigerant condenser; which comprises the steps of:

(a) heating solution by passing it in heat exchange relation with solvent vapor in the condensing section of said low temperature evaporator, thereby condensing solvent;

(b) splitting solution from said low temperature evaporator into two portions;

(c) further heating one portion of said solution from said low temperature evaporator by passing said one portion of it in heat exchange relation with solvent vapor in the condensing section of said high temperature evaporator, thereby condensing additional solvent;

(d) further heating said one portion of solution by subsequently passing it from said low temperature evaporator into heat exchange relation with heat rejected from said prime mover in the power cycle heat exchanger;

(e) evaporating solvent from said one portion of solution in the evaporating section of said high temperature evaporator;

(f) further heating the other portion of said solution from said low temperature evaporator by passing it in heat exchange relation with refrigerant vapor in said refrigerant condenser, thereby condensing refrigerant and heating said other portion of solution to a temperature lower than that of the solution leaving said power cycle heat exchanger;

(g) evaporating solvent from both of said portions of solution in the evaporating section of said low temperature evaporator;

(h) evaporating refrigerant by passing it in heat exchange relation with a suitable source of heat;

(i) withdrawing evaporated refrigerant from the condensing section of said refrigerant evaporator, compressing said refrigerant in said compressor, passing compressed refrigerant to said refrigerant condenser, and passing condensed refrigerant to said refrigerant evaporator; and (j) collecting condensed solvent from the condensing sections of said evaporators, and withdrawing and discharging solution from the evaporating section of said low temperature evaporator.

9. A method of separating a solvent from a solution in an apparatus including a refrigerated evaporator having a condensing section with a refrigerant evaporator therein and a solution evaporating section, a high temperature evaporator having a condensing section and an evaporating section, a low temperature evaporator having a condensing section and an evaporator section, a refrigerant compressor driven by a prime mover, a power cycle heat exchanger, and a refrigerant condenser; which comprises the steps of:

(a) heating solution by passing it in heat exchange relation with solvent vapor in the condensing section of said low temperature evaporator, thereby condensing solvent;

(b) splitting solution heated in said low temperature evaporator into two portions;

(c) further heating one portion of said solution from said low temperature evaporator by passing it in heat exchange relation with solvent vapor in the condensing section of said high temperature evaporator, thereby condensing additional solvent;

(d) further heating said one portion of solution by passing it from said low temperature evaporator into heat exchange relation with heat rejected from said prime mover in the power cycle heat exchanger;

(e) evaporating solvent from said one portion of solution in the evaporating section of said high temperature evaporator;

(f) further heating another portion of said solution from said low temperature flash evaporator by passing it in heat exchange relation with refrigerant vapor in said refrigerant condenser, thereby condensing refrigerant vapor therein and heating said other portion of solution to a lower temperature than that of the solution leaving said power cycle heat exchanger;

(g) combining and evaporating solvent from both of said portions of solution in the evaporating section of said low temperature evaporator;

(h) evaporating additional solvent from said solution by passing it in heat exchange relation with evaporating refrigerant in the condensing section of said refrigerated evaporator;

(i) withdrawing evaporated refrigerant from the condensing section of said refrigerated evaporator, compressing said refrigerant in said compressor, passing compressed refrigerant to said refrigerant condenser, and passing condensed refrigerant to said refrigerant evaporator; and (j) collecting condensed solvent from the condensing sections of said evaporators, and withdrawing and discharging solution from said system.

10. A method of separating a solvent from a solution as defined in claim 9 including the additional step of passing said condensed refrigerant from said refrigerant condenser to said refrigerant evaporator in heat exchange relation with solution from the evaporating section of said low temperature evaporator, to heat said solution and to increase the cooling in said refrigerant evaporator.

References Cited by the Examiner
UNITED STATES PATENTS

| | | | |
|---|---|---|---|
| 3,021,265 | 2/1962 | Sadtler et al. | 203—22 X |
| 3,234,109 | 2/1966 | Lustenader | 203—22 X |
| 3,243,359 | 3/1966 | Schmidt | 203—10 |

ROBERT A. O'LEARY, *Primary Examiner.*

W. E. WAYNER, *Assistant Examiner.*